(12) United States Patent
Mai

(10) Patent No.: US 7,102,162 B2
(45) Date of Patent: Sep. 5, 2006

(54) PLANE LIGHT SOURCE STRUCTURE FOR PLANAR DISPLAY

(76) Inventor: Che-Kuei Mai, No.14,Alley 53, Lane 167, Dungnan St., Hsinchu (TW) 300

( * ) Notice: Subject to any disclaimer, the term of this patent is extended or adjusted under 35 U.S.C. 154(b) by 38 days.

(21) Appl. No.: 10/317,062

(22) Filed: Dec. 12, 2002

(65) Prior Publication Data
US 2004/0113162 A1    Jun. 17, 2004

(51) Int. Cl.
H01L 29/04     (2006.01)
H01L 31/036    (2006.01)
H01L 31/0376   (2006.01)
H01L 31/20     (2006.01)

(52) U.S. Cl. .............................. 257/59; 257/72; 257/88

(58) Field of Classification Search ................. 257/59, 257/72, 82, 88, 62, 63, 65, 96; 349/62, 63, 349/65, 96
See application file for complete search history.

(56) References Cited

U.S. PATENT DOCUMENTS 6,099,134 A * 8/2000 Taniguchi et al. ............ 362/31
6,522,373 B1 * 2/2003 Hira et al. ................. 362/603

FOREIGN PATENT DOCUMENTS

JP       6-95111        4/1994
JP       2001-318367  * 11/2001

* cited by examiner

Primary Examiner—Thien F. Tran
(74) Attorney, Agent, or Firm—Quintero Law Office

(57) ABSTRACT

A plane light source structure for planar display includes a light guide plate and a light source. Material of the light guide plate is transparent plastic. The light guide plate is regarded as the lower plate of LCD panel when it is used as back light. On the other hand, the light guide plate is regarded as the upper plate of LCD panel when it is used as front light.

11 Claims, 8 Drawing Sheets

PLANE LIGHT SOURCE STRUCTURE FOR PLANAR DISPLAY

BACKGROUND OF THE INVENTION

1. Field of the Invention

The present invention generally relates to a plane light source structure, and more particularly to a plane light source structure for planar display.

2. Description of the Prior Art

Typically, plane light source is always for liquid crystal display devices. Plane light source projected from rear end of the liquid crystal display devices is called back light source, while plane light source projected from the front side of the liquid crystal display devices is called front light source. Liquid crystal display devices using back light source are called transmissive-type, while using front light source are called reflective-type. No matter the transmissive-type or reflective-type liquid crystal display devices are used, a high brightness and stable light source is necessary.

A conventional transmissive-type liquid crystal display device, as shown in FIG. 1, has a flat light guide plate 102 that is used to guide light rays from two light sources 104-1 and 104-2 at the two opposite ends of the light guide plate 102 to light-emitting surface thereof and to liquid crystal panel. There are many convex/concave dots on the bottom of the light guide plate 102 in FIG. 1 to reflect light rays to the upper side. Another way for reflecting upward light rays is to utilize a plurality of slanted portions (V-cuts). A reflector 106 below the opposite surface of light-emitting surface of the light guide plat 102 reflects all refractive downward light rays to the light-emitting surface of the light guide plate 102. A polarizing plate 108 and a lower substrate 110 are sequentially on the light guide plate 102. The material of conventional lower substrate 110 uses transparent glass, which thin film transistors 112 are directly formed thereon. A passivation layer 114 and transparent electrodes 116 are formed sequentially on the lower substrate 110 to form a lower plate of the liquid crystal panel. Next, a color filter 122 and transparent electrodes 120 are formed sequentially on another transparent glass, which is upper substrate 124 of the liquid crystal panel, to form upper plate of the liquid crystal panel. Then, upper plate and lower plate are sealed with transparent electrode layers 116, 120 face to face and vacuumed, and liquid crystal 118 is injected into the space between the upper and lower plates to form the liquid crystal panel. Finally, a polarizing plate 126 is placed on the upper substrate 124 to form a transmissive-type liquid crystal display device 100. Transmissive-type liquid crystal display devices are usually for television or monitor of a computer, especially for large-scale display devices.

The light guide plate 102 in FIG. 1 is flat. However, there is another type light guide plate, such as the wedge light guide plat 103, as shown in FIG. 2. Reflecting light manner of the wedge light guide plate 103 can only use a plurality of slanted portions (V-cuts) to guide the light rays to the light-emitting surface vertically. It has an advantage for the wedge light guide plate 103 that only single light source 104 is needed.

As shown in FIG. 3, a technique of hollow light guide plate announced by Fujitsu is disclosed. Light rays from a plurality of light sources 202 passing through mirrors 204 enter reflection zone in-between. There are four control plates 206 in the reflection zone to guide light rays to light-emitting surface appropriately. Reflectors 208 are located below the control plates 206 to reflect light rays back to the light-emitting surface. Finally, light rays illuminate liquid crystal display panel through the lenses 210. This kind of plane light source structure is very complicated, and will not be used due to manufacturing cost as well as yield.

Another conventional reflective-type liquid crystal display device is shown in FIG. 4, wherein light guide plate 102 is located on the liquid crystal display panel, and thin film transistors 112 are formed on the lower substrate 110 directly. A passivation layer 114 and a reflective film 115 are formed on the lower substrate 110 sequentially to form so called lower plate of the liquid crystal display panel. Then, color filter 122 and transparent electrode layer 120 are formed on another transparent glass, which is upper substrate 124 of the liquid crystal display panel, to form so called upper plate of the liquid crystal display panel. The transparent electrode layer of the upper plate and the reflective film of the lower plate are sealed face to face and vacuumed, and then liquid crystal 118 is injected into the space between the upper and lower plates to form the so called liquid crystal display panel. A retardation film 127, a polarizing plate 126, and a light guide plate 102 are sequentially on the upper substrate 124. A light source 104 is at one end surface of the light guide plate 102. The retardation film 127 is to retard phase of incident light usually by quarter wavelength, and called retardation film of quarter wavelength.

The light source of reflective-type liquid crystal display device is on the front side of liquid crystal display panel, and also called front light source. Light rays from the light source 104 are guided downward by the light guide plate 102 and reflected upward to user by reflective film 115. Reflective-type liquid crystal display devices are usually used for display panel of watches or mobile phones, especially for small-scale display devices.

Planar display devices now are toward to minimized volume and reduced weight. It is difficult to achieve minimized volume of the planar display devices, and particularly to apply the planar display devices to dual display module. Moreover, light rays in the liquid crystal panel pass through many media, and energy of the light rays is substantially lost. Illumination of light rays emitted from the light source is thus decreased when the light rays are received by eyes of user. It is necessary to develop another planar display device that can minimize volume, reduce weight of the display device and increase illumination of light rays.

SUMMARY OF THE INVENTION

In the light of the state of the art described above, it is an object of the present invention to provide a plane light source structure for planar display device which is immune to the problems of the conventional structure of the plane light source described above. A plastic light guide plate is used as substrate of the plane display device, in which light guide plate can be lower substrate of transmissive-type liquid crystal display device or upper substrate of reflective-type liquid crystal display device.

It is another object of this invention that whole display module can be lighter by using plastic substrate.

It is still another object of this invention that volume of whole display module can be minimized and the thickness of whole display module is thinner because light guide plate is used as the substrate of liquid crystal display. The conventional glass substrate of liquid crystal display is removed when display panel is replaced with light guide plate.

It is a further object of this invention that weight of dual display module can be reduced by using plastic substrate when this invention is applied thereto.

In view of the above and other objects which will become apparent as the description proceeds, there is provided according to a general aspect of the present invention a plane light source structure for planar display device which comprises a first light source; and a first light guide plate with a light-emitting surface, wherein a plurality of thin film transistors (TFTs) are directly formed on the light-emitting surface, and the first light guide plate is used as a substrate of the planar display device; and a polarizing plate located between the first light source and the first light guide plate.

Based on the idea described above, wherein material of the first light guide plate is transparent plastic.

Based on the aforementioned idea, the plane light source structure for planar display device further comprises a polarizing plate located between the first light cource and the first light guide plate.

Based on the idea described above, wherein the planar display device is a first liquid crystal display device.

Based on the aforementioned idea, wherein the first light guide plate is lower substrate of the first liquid crystal display device when the first light source plate serves as a back light source of the first liquid crystal display device.

Based on the idea described above, wherein the first light source is located at end surface of the first light guide plate.

Based on the aforementioned idea, the plane light source structure for planar display device further comprises a second light source located at the other end surface of the first light guide plate.

Based on the idea described above, wherein the first light source is a plane light source.

Based on the aforementioned idea, wherein the first light guide plate is placed on the first light source.

Based on the idea described above, the plane light source structure for planar display device further comprises a second liquid crystal display using the first light guide plate as a lower substrate, wherein the second liquid crystal display device is opposite to the first liquid crystal display device by the first light guide plate to form a dual display device.

Based on the aforementioned idea, the plane light source structure for planar display device further comprises a second light source located at the other end surface of the first light guide plate.

Based on the idea described above, the plane light source structure for planar display device further comprises a second light guide plate served as front light source of the second liquid crystal display, and a second light source located at one end surface of the second light guide plate.

Based on the aforementioned idea, the plane light source structure for planar display device further comprises a retardation film located between the first light guide plate an the polarizing plate.

Based on the idea described above, wherein the first light guide plate is upper substrate of the liquid crystal device when the first light guide plate serves as front light source of the liquid crystal display device.

Based on the aforementioned idea, wherein the first light guide plate includes a plate and a plurality of slanted portions (V-cuts) made by an ultraviolet curable resin on the plate.

Based on the idea described above, wherein the first light source is located at one end surface of the first light guide plate.

Based on the aforementioned idea, the plane light source structure for planar display device further comprises a second light source located at the other end surface of the first light guide plate.

Based on the idea described above, the plane light source structure for planar display device further comprises a second liquid crystal display, wherein lower substrate of the first liquid crystal display is served as lower substrate of the second liquid crystal display device: a second light guide plate as front light source of the second liquid crystal display device; and a second light source located at one end surface of the second light guide plate, wherein the second liquid crystal display device is opposite to the first liquid crystal display device by the lower substrate to form a dual display device.

Based on the aforementioned idea, the plane light source structure for planar display device further comprises a touch panel placed on the first light guide plate.

There is provided according to a general aspect of the present invention a plane light source structure for liquid crystal display panel which comprises a first light source; and a first light guide plate with a light-emitting surface, and a plurality of thin film transistors (TFTs) are directly formed on the first light guide plate being used as a substrate of the liquid crystal display panel; and a polarizing plate located between the first light source and the first light guide plate.

Based on the idea described above, wherein material of the first light guide plate is transparent plastic.

Based on the aforementioned idea, the plane light source structure for liquid crystal display panel further comprises a polarizing plate located between the first light source and the first light guide plate.

Based on the idea described above, the plane light source structure for liquid crystal display panel further comprises a second light source located at the other end surface of the first light guide plate, and a second polarizing plate located between the second light source and the first light guide plate.

There is provided according to a general aspect of the present invention a plane light source structure for liquid crystal display panel which comprises a first light source; and a first light guide plate with a light-emitting surface, wherein the first light guide plate is used as a upper substrate of the liquid crystal display panel to guide the light rays from the first light source located at one end surface of the first light guide plate to the light-emitting surface for illuminating uniformly.

Based on the idea described above, wherein material of the first light guide plate is transparent plastic.

Based on the aforementioned idea, the plane light source structure for liquid crystal display panel further comprises a polarizing plate located between the first light source and the first light guide plate.

Based on the idea described above, the plane light source structure for liquid crystal display panel further comprises a retardation film located between the polarizing plate and the first light guide plate.

Based on the aforementioned idea, wherein the first light guide plate includes a plate and a plurality of slanted portions (V-cuts) made with an ultraviolet curable resin on the plate.

Based on the idea described above, the plane light source structure for liquid crystal display panel further comprises a second light source located at the other end surface of the first light guide plate.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Some sample embodiments of the present invention will now be described in greater detail. Nevertheless, it should be recognized that the present invention can be practiced in a wide range of other embodiments besides those explicitly described, and the scope of the present invention is expressly not limited except as specified in the accompanying claims.

Figure 1:
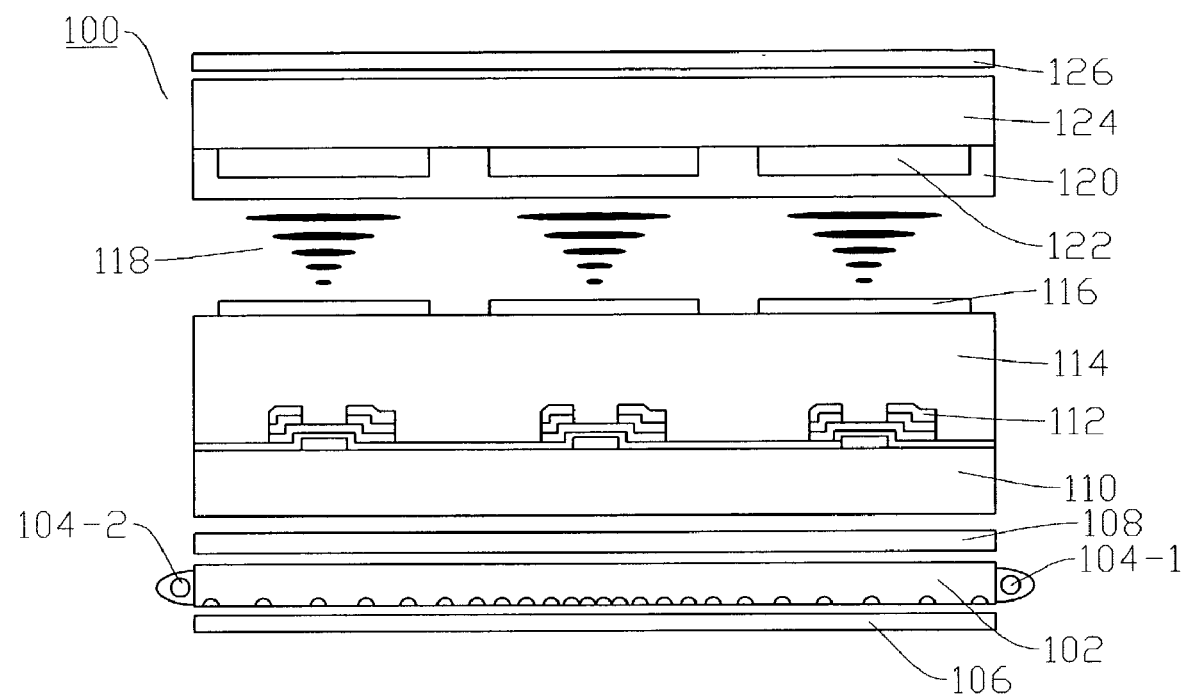
FIG. 1 illustrates a schematic structure of conventional transmissive-type liquid crystal display device.
Figure 2:
FIG. 2 illustrates a schematic structure of conventional back light source structure with wedge light guide plate.
Figure 3:
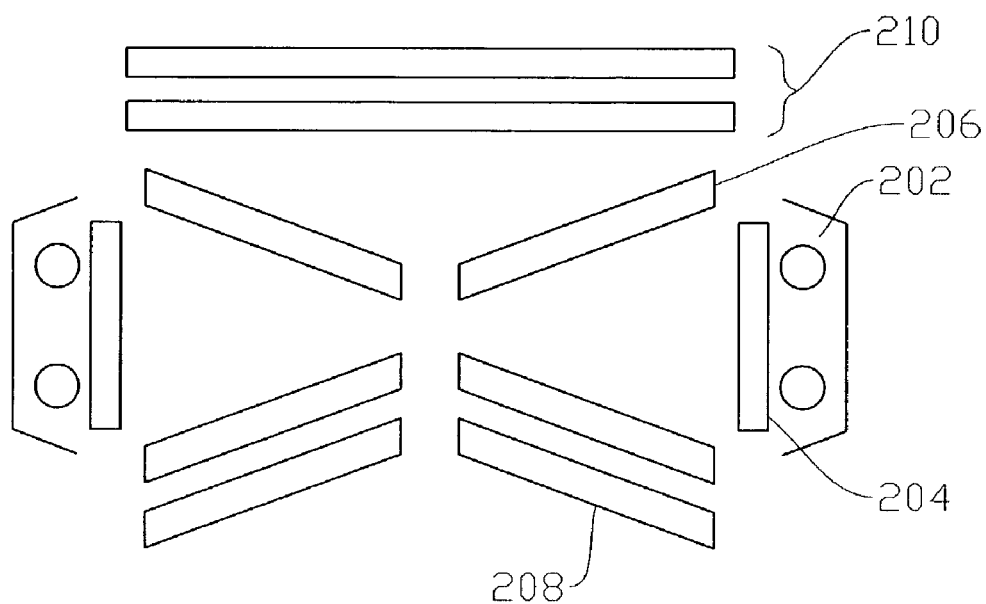
FIG. 3 illustrates a schematic structure of hollow flat light guide plate provided by Fujitsu.
Figure 4:
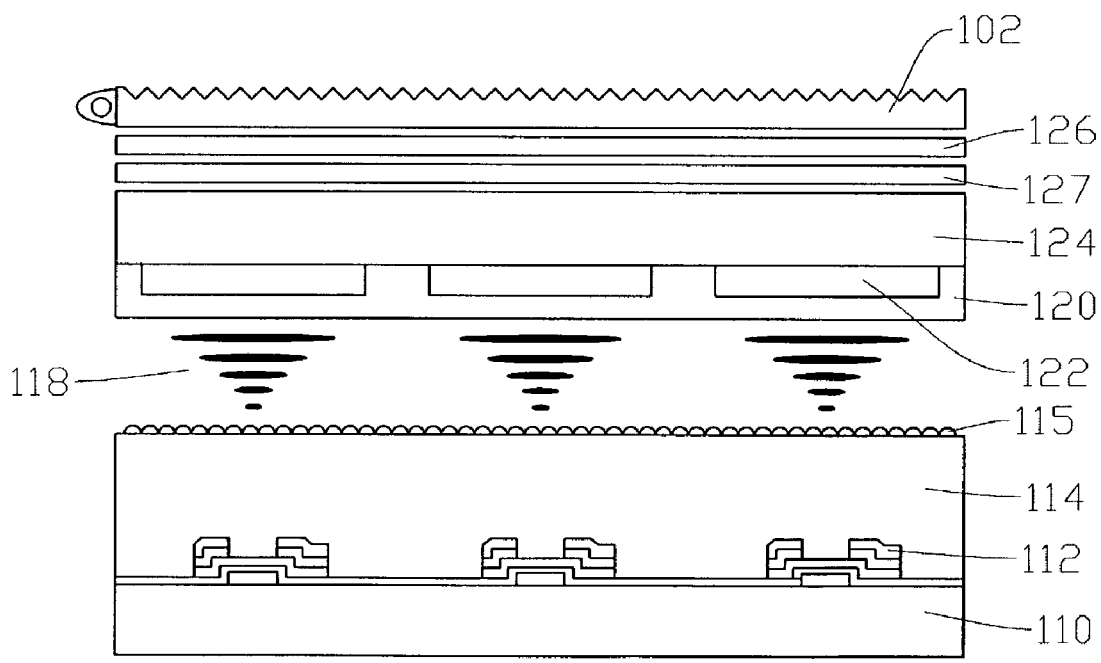
FIG. 4 illustrates a schematic structure of conventional reflective-type liquid crystal display device.
Figure 5:
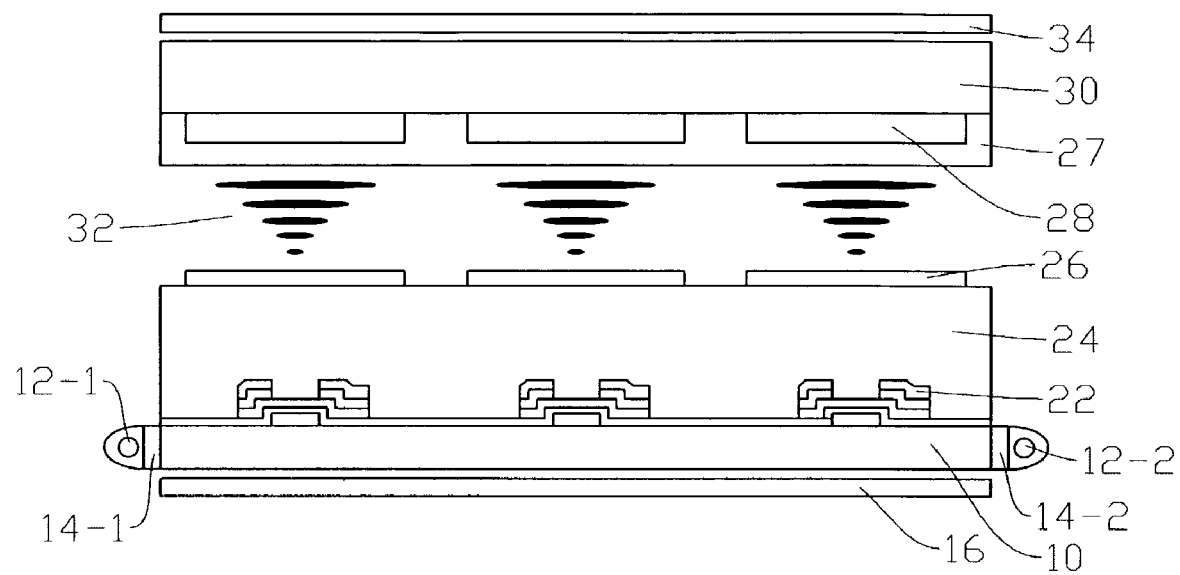
FIG. 5 illustrates a schematic structure of a transmissive-type liquid crystal display device by using light guide plate as lower substrate of the liquid crystal display panel in accordance with this invention.

The following description is to disclose a first embodiment of a plane light source structure for planar display device according to this invention. Referring to FIG. 5, a light source 12 is located at one end surface of a light guide plate 10, and a polarizing plate 14 is between the light source 12 and the light-receiving surface of the light guide plate 10. The light guide plate 10 is flat in this embodiment and convex/concave dots or a plurality of slanted portions (V-cuts) can be used to guide light rays from the light source 12 to light-emitting surface of the light guide plate 10. The light source 12 can be single light source 12-1 or double light sources 12-1, 12-2 in this embodiment. However, it will have more well-distributed illumination to use the double light sources 12-1, 12-2. The wedge light guide plate can also be used for the light guide plate 10. The polarizing plate 14 can be placed on the light-receiving surface or light-emitting surface of the light guide plate 10 that has the same effect but is totally different for the adhered area. In this invention, the polarizing plate 14 is adhered on the light-receiving surface to decrease the adhered area substantially, and medium to be passed from light source 12 to user can be reduced.

Material of the light guide plate 10 may be transparent plastic in this embodiment, and the light guide plate 10 can be used as substrate of liquid crystal display panel in this invention. Referring to FIG. 5, thin film transistors 22 are formed directly on the light guide plate 10, and the light guide plate 10 becomes lower substrate of the liquid crystal display panel. Then, the other components of the liquid crystal display panel are followed to manufacture by the conventional processes. First, a passivation layer 24 and a transparent electrode layer 26 are subsequently formed on the light guide plate 10 to form lower plate of the liquid crystal display panel. Next, color filter 28 and transparent electrode layer 27 are formed on another transparent plate, which is upper substrate 30 of the liquid crystal display panel, to form upper plate of the liquid crystal display panel. Thereafter, upper plate and lower plate are sealed with transparent electrode layers 26, 27 face to face and vacuumed, and liquid crystal 32 is injected into the space between the upper and lower plates to form liquid crystal display panel. Then, a polarizing plate 34 is attached on the upper substrate 30 to form main structure of a transmissive-type liquid crystal display device. Material of the upper substrate 30 can be glass or transparent plastic in this embodiment.

Figure 6:
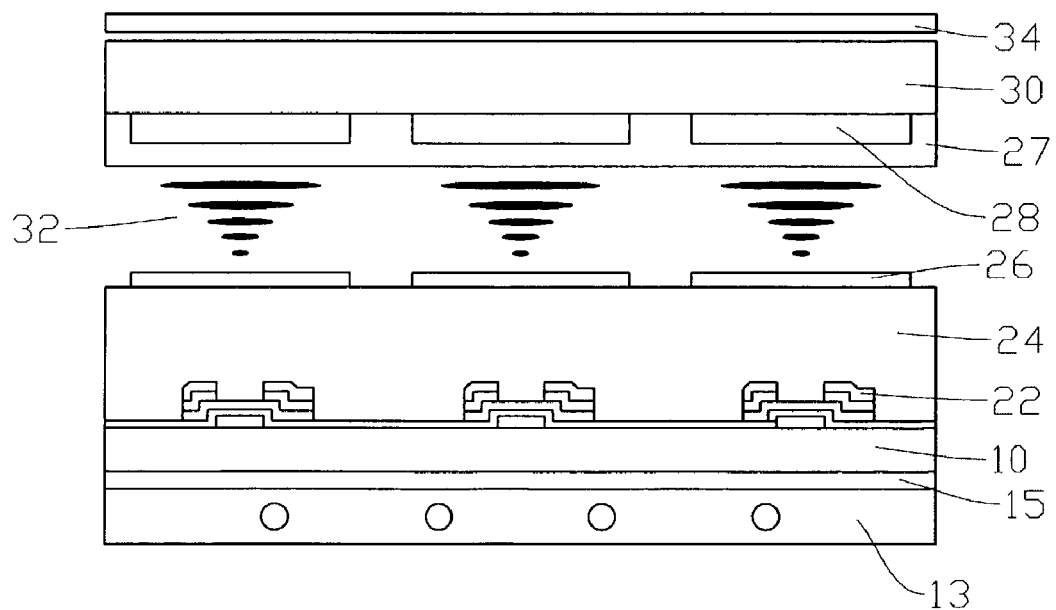
FIG. 6 illustrates another schematic structure of a transmissive-type liquid crystal display device by using light guide plate as lower substrate of the liquid crystal display panel in accordance with this invention.

Referring to FIG. 6, the second embodiment of this invention is disclosed. The key feature of this embodiment is to use plane light source 13 under light guide plate 10, and a polarizing plate 15 is located between the light-receiving surface of the light guide plate 10 and the plane light source 13. Flat light guide plate is suitable for the light guide plate 10 in this embodiment, and convex/concave dots or a plurality of slanted portions (V-cuts) can be used for well-distributed of light rays in the light guide plate 10, in which pattern of the convex/concave dots have different arrangement compared to the above embodiment. Structure of the plane light source 13 can be assembled by a plurality of cold cathode fluorescent tube (CCFL) or light emitting diode (LED) array. Then, thin film transistors 22, passivation layer 24 and transparent electrode layer 26 are formed on the light guide plate 10 sequentially to form lower plate of the liquid crystal display panel. Next, color filter 28 and transparent electrode layer 27 are formed on another transparent plate, which is upper substrate 30 of the liquid crystal display panel, to form upper plate of the liquid crystal display panel. Thereafter, upper plate and lower plate are sealed with transparent electrode layers 26, 27 face to face and vacuumed, and liquid crystal 32 is injected into the space between the upper and lower plates to form liquid crystal display panel. Then, a polarizing plate 34 is adhered on the upper substrate 30 to form main structure of a transmissive-type liquid crystal display device.

Figure 7:
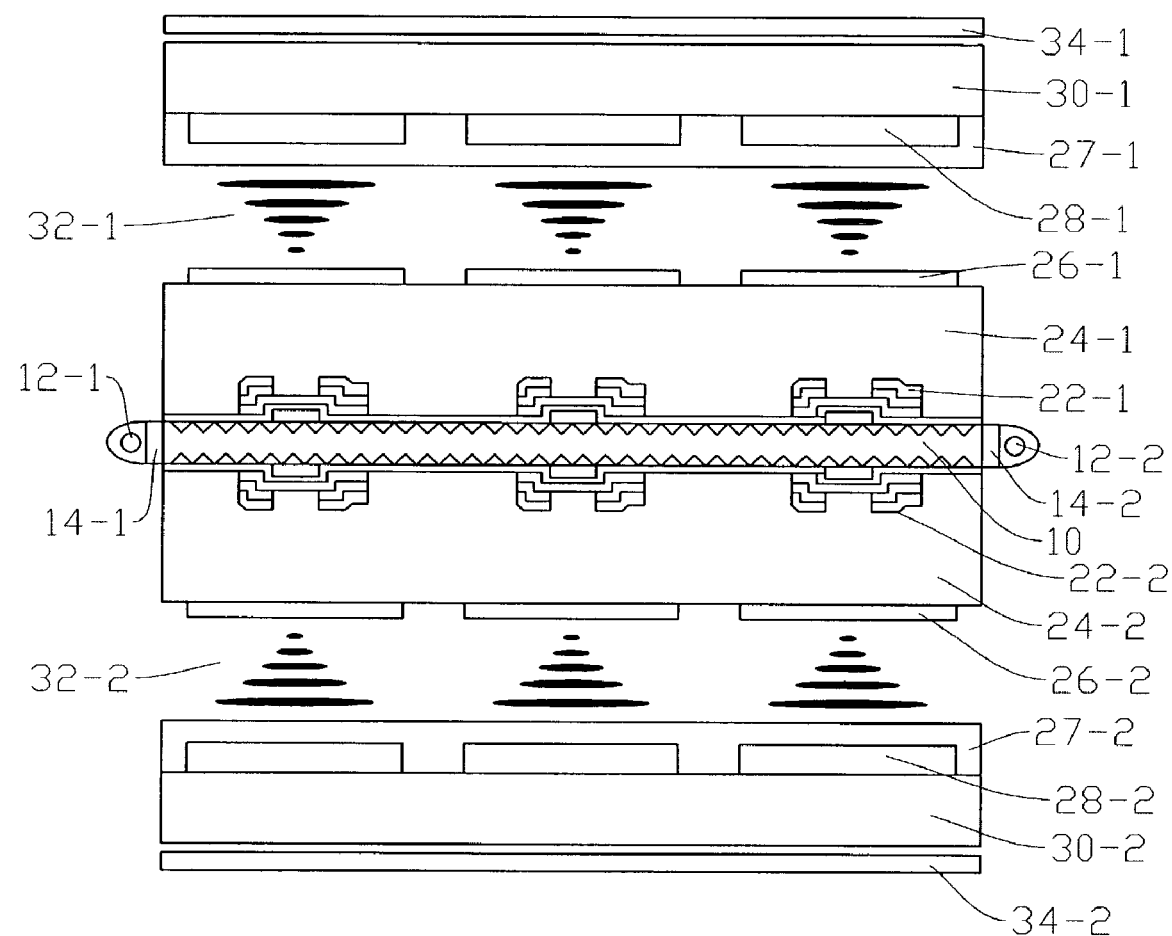
FIG. 7 illustrates a schematic structure of two transmissive-type liquid crystal display panels by using one common light guide plate as lower substrate of the two liquid crystal display panels in accordance with this invention.

Referring to FIG. 7, it is a substantial advantage to apply this invention to dual liquid crystal display panel module. In the third embodiment, a dual illuminating light guide plate is used for the back light sources and the lower substrates of two liquid crystal display panels. In FIG. 7, material of flat light guide plate 10 is transparent plastic, and a plurality of slanted portions (V-cuts) are used to guide light rays from light source 12 located at end surface of the light guide plate 10 into two opposite light-emitting surfaces. Similarly, a polarizing plate 14 is between the light source 12 and light guide plate 10. Because a plurality of slanted portions (V-cuts) are used in this embodiment, both two opposite light-emitting surfaces need to be planarized so that thin film transistors 22-1 and 22-2 can be formed on the two opposite light-emitting surfaces of the light guide plate 10 as the first embodiment, and the light guide plate 10 is therefore becomes common lower substrate of two liquid crystal display panels. Similarly, light source 12 can be single light source 12-1 or double light sources 12-1, 12-2 in this embodiment. Of course, it will have well-distributed illumination to use the double light sources 12-1, 12-2. Then, other components of the liquid crystal display panel are followed to manufacture by conventional processes. First, passivation layers 24-1, 24-2 and transparent electrode layers 26-1, 26-2 are subsequently formed on the two opposite light-emitting surfaces of light guide plate 10 to form common lower plate of two liquid crystal display panels. Next, color filters 28-1, 28-2 and transparent electrode layers 27-1, 27-2 are formed on two transparent plates respectively, which are two upper substrates 30-1, 30-2 of the two liquid crystal display panels, to form upper plates of the two liquid crystal display panels. Thereafter, two upper plates and one common lower plate are sandwiched and sealed with transparent electrode layers 26-1, 27-1 face to face and transparent electrode layers 26-2, 27-2 face to face and vacuumed, and liquid crystal 32 is injected into the spaces between the two upper plates and one common lower plate to form the two liquid crystal display panels. Then, two polarizing plates 34-1, 34-2 are adhered on the upper substrates 30-1, 30-2 to form main structure of two transmissive-type liquid crystal display devices.

Figure 8:
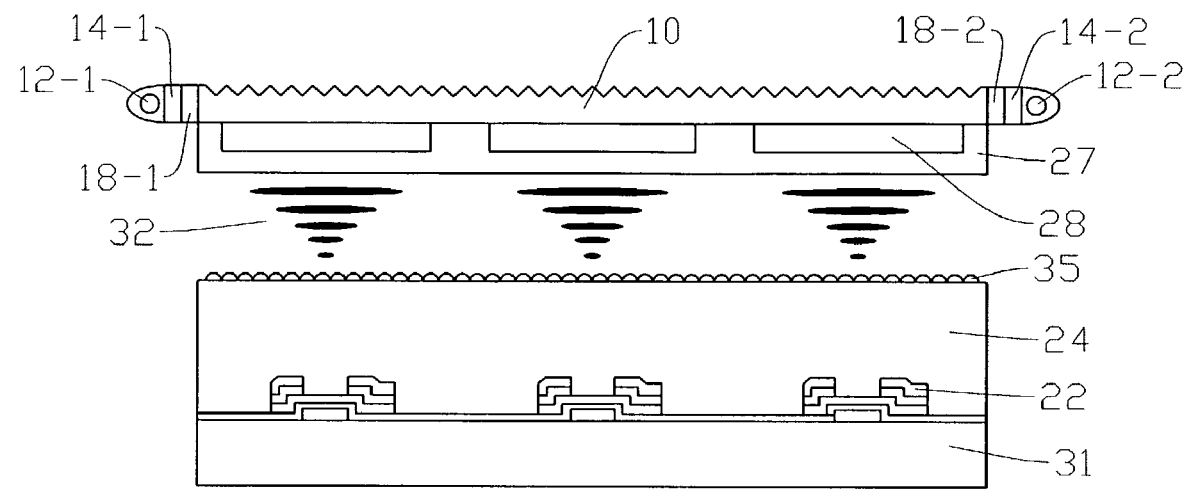
FIG. 8 illustrates a schematic structure of a reflective-type liquid crystal display device by using light guide plate as upper substrate of the liquid crystal display panel in accordance with this invention.

Referring to FIG. 8, this invention can also be applied to reflective-type liquid crystal display device. In the reflective-type liquid crystal display device, due to front light source is used, light guide plate can replace upper substrate of the reflective-type liquid crystal display device. As shown in FIG. 8, in the fourth embodiment, thin film transistors 22, a passivation layer 24, and a reflective film 35 are formed sequentially on a lower substrate 31 to form a lower plate of a liquid crystal display panel. Material of the lower substrate can be glass, plastic, or other opaque plates. Then, color filter 28 and transparent electrode layer 27 are formed on light-emitting surface of the light guide plate 10, which is upper substrate of the liquid crystal display panel, to form upper plate of the liquid crystal display panel. Thereafter, upper plate and lower plate are sealed with transparent electrode layers 26, 27 face to face and vacuumed, and liquid crystal 32 is injected into the space between the upper and lower plates to form liquid crystal display panel. A light source is located at one end surface of the light guide plate 10, and a retardation film 18 and a polarizing plate 14 are located between light-receiving surface of the light guide plate 10 and the light source 12. Like the first embodiment, the retardation film 18 and the polarizing plate 14 are adhered on the light-receiving surface of the light guide plate 10 to decrease the adhered area substantially, and medium to be passed from light source 12 to user can be reduced. Similarly, light source 12 can be single light source 12-1 or double light sources 12-1, 12-2 in this embodiment. However, it will have well-distributed illumination to use the double light sources 12-1, 12-2.

Figure 9:
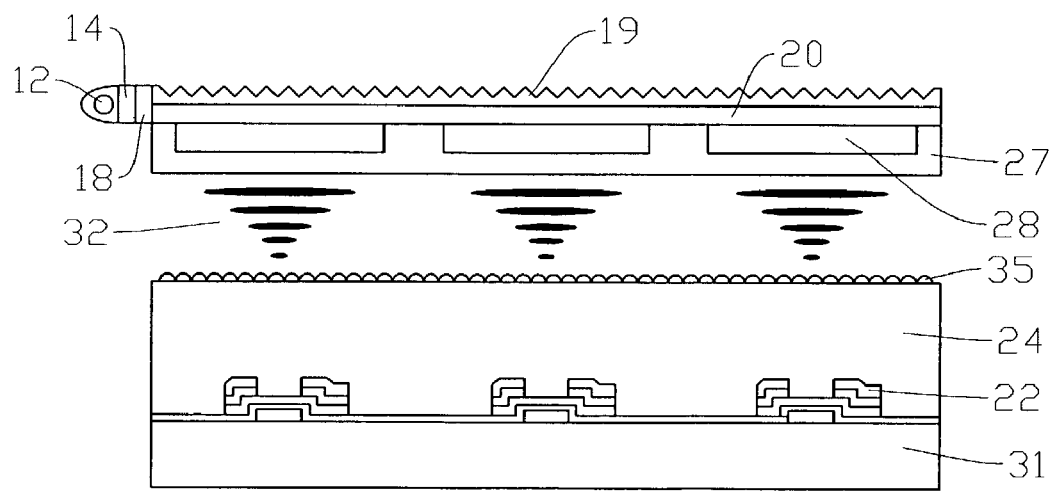
FIG. 9 illustrates another schematic structure of a reflective-type liquid crystal display device by using light guide plate as upper substrate of the liquid crystal display panel in accordance with this invention.

Referring to FIG. 9, a fifth embodiment is disclosed. Light guide plate, compared to the fourth embodiment, is assembled by a plate 20 and an UV curable resin layer 19 with a plurality of slanted portions (V-cuts), in which material of the plate 20 can be glass or plastic.

Figure 10:
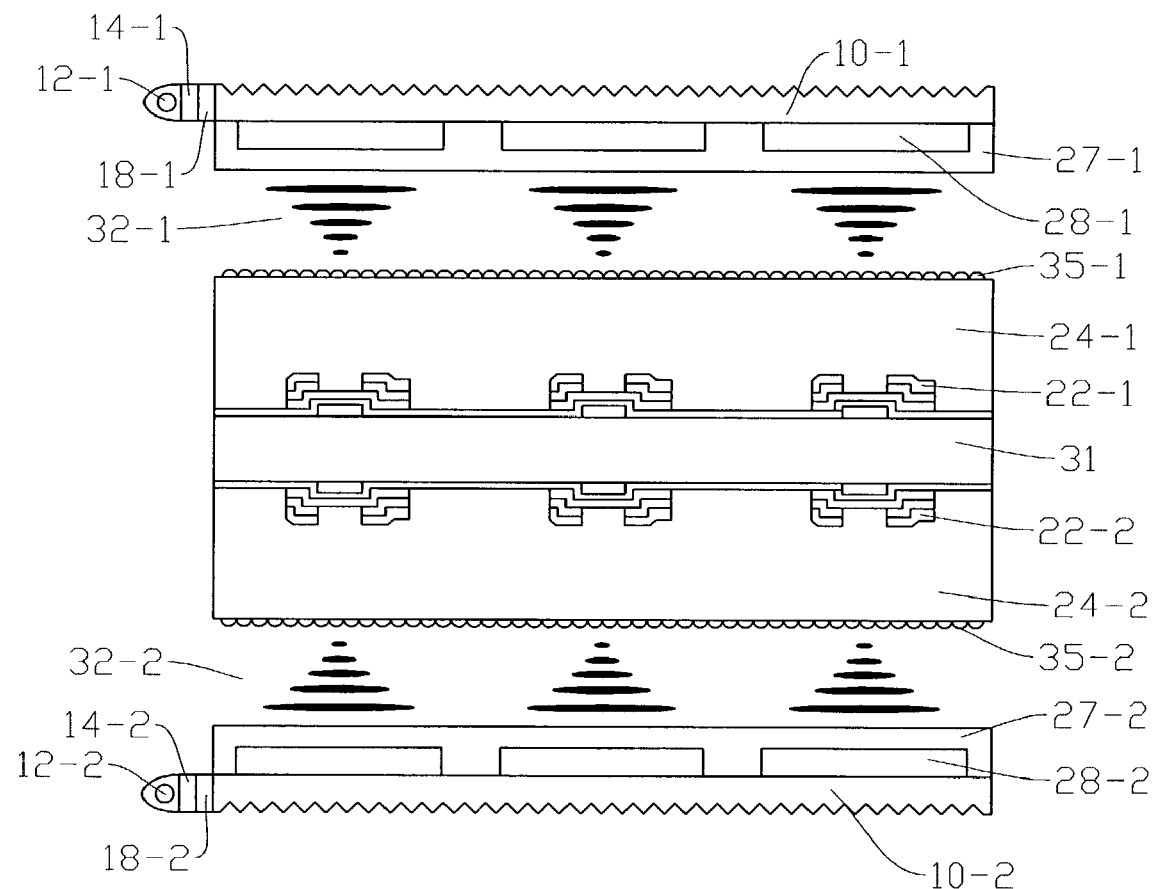
FIG. 10 illustrates a schematic structure of two reflective-type liquid crystal display devices by using two light guide plates as two upper substrates of the two liquid crystal display panels in accordance with this invention.

Referring to FIG. 10, dual display module assembled by two reflective-type liquid crystal display panels is applied to this invention in sixth embodiment. The dual display module uses a common lower substrate 31 in this embodiment. Thin film transistors 22-1, 22-3, passivation layers 24-1, 24-2 and reflective films 35-1, 35-2 are formed on both opposite sides of the lower substrate 31 separately as a common lower plate of two liquid crystal display panels. Then, color filters 28-1, 28-2 and transparent electrode layers 27-1, 27-2 are sequentially formed on light-emitting surfaces of the two light guide plate 10-1, 10-2, which are two upper substrates of the two liquid crystal display panels, to form two upper plates of the two liquid crystal display panels. Thereafter, the two upper plates and the one common lower plate are sandwiched and sealed with transparent electrode layer 27-1 and reflective film 35-1 face to face as well as transparent electrode layer 27-2 and reflective film 35-2 face to face and vacuumed, and liquid crystal 32 is injected into the spaces between the two upper plates and the one common lower plate to form the two liquid crystal display panels. Then, two retardation films 18-1, 18-2 and two polarizing plates 14-1, 14-2 are adhered sequentially on light-receiving surfaces of the light guide plates 10-1, 10-2. Two light sources 12-1, 12-2 are located at end surfaces of the light guide plates 10-1, 10-2 respectively.

Figure 11:
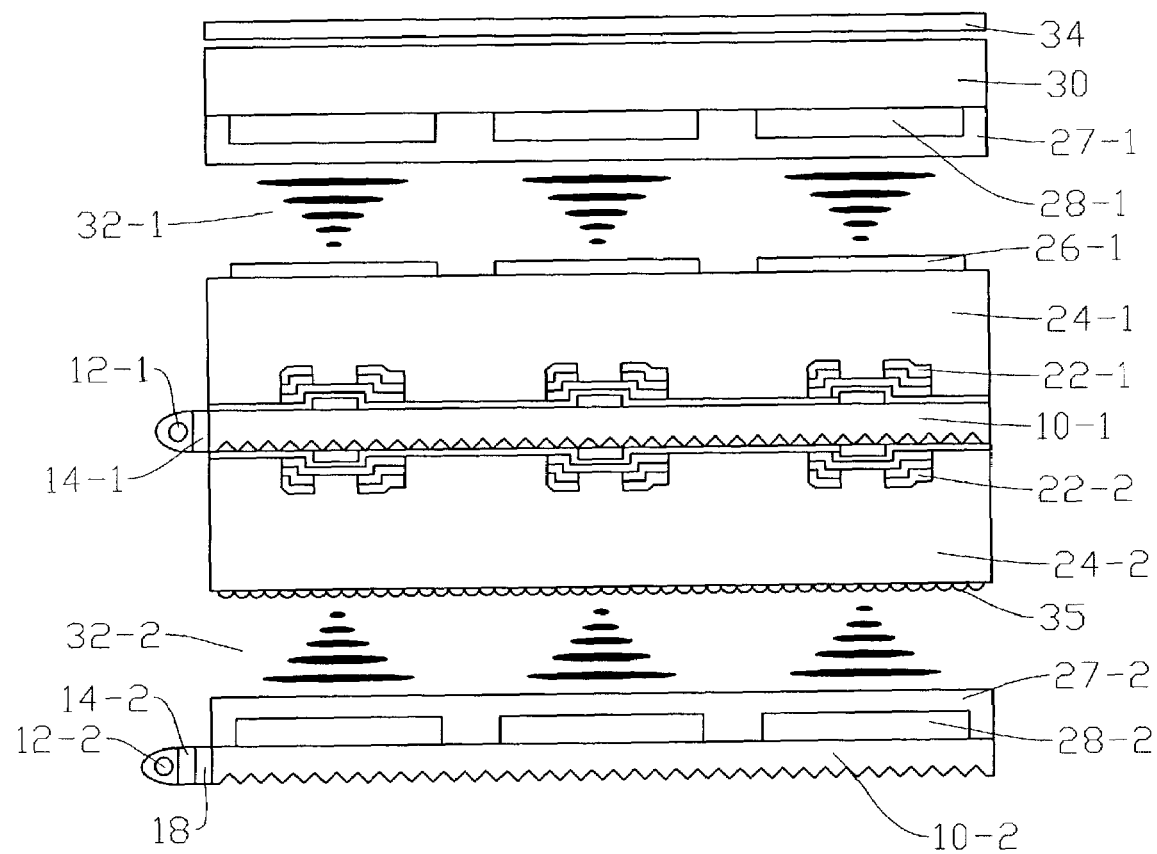
FIG. 11 illustrates a schematic structure of a reflective-type liquid crystal display device by using one light guide plate as upper substrate of liquid crystal display panel and one transmissive-type liquid crystal display device by using one light guide plate as lower substrate of liquid crystal display panel in accordance with this invention.

Referring to FIG. 11, dual display module assembled by one transmissive-type liquid crystal display panel and one reflective-type liquid crystal display panel is applied to this invention in seventh embodiment. A light source 12-1 is located at one end surface of a light guide plate 10-1, in which a polarizing plate 14-1 is adhered between the light source 12-1 and the light guide plate 10-1. Thin film transistors 22-1, a passivation layer 24-1, and a transparent electrode layer 26-1 are formed sequentially on light-emitting surface of the light guide plate 10-1 to form lower plate of the transmissive-type liquid crystal display panel. Then, color filter 28-1 and a transparent electrode layer 27-1 are formed on another transparent plate, which is upper substrate 30-1 of the liquid crystal display panel, to form upper plate of the transmissive-type liquid crystal display panel. Thereafter, upper plate and lower plate are sealed with transparent electrode layers 26-1, 27-1 face to face and vacuumed, and liquid crystal 32-1 is injected into the space between the upper and lower plates to form liquid crystal display panel. Then, a polarizing plate 34-1 is adhered on the upper substrate 30-1 to form main structure of a transmissive-type liquid crystal display device. On the other hand, thin film transistors 22-2, a passivation layer 24-2, and a reflective film 35-2 are formed on the other surface opposite to the light-emitting surface of the light guide plate 10-1. Then, color filter 28-2 and transparent electrode layer 27-2 are formed on light-emitting surface of the light guide plate 10-2, which is upper substrate of the reflective-type liquid crystal display panel, to form upper plate of the reflective-type liquid crystal display panel. Thereafter, upper plate and lower plate are sealed with transparent electrode layers 27-2 and reflective film 35 face to face and vacuumed, and liquid crystal 32-2 is injected into the space between the upper and lower plates to form the reflective-type liquid crystal display panel. A light source 12-2 is located at one end surface of the light guide plate 10-2, and a retardation film 18-2, and a polarizing plate 14-2 are located between light-receiving surface of the light guide plate 10-2 and the light source 12-2.

Figure 12:
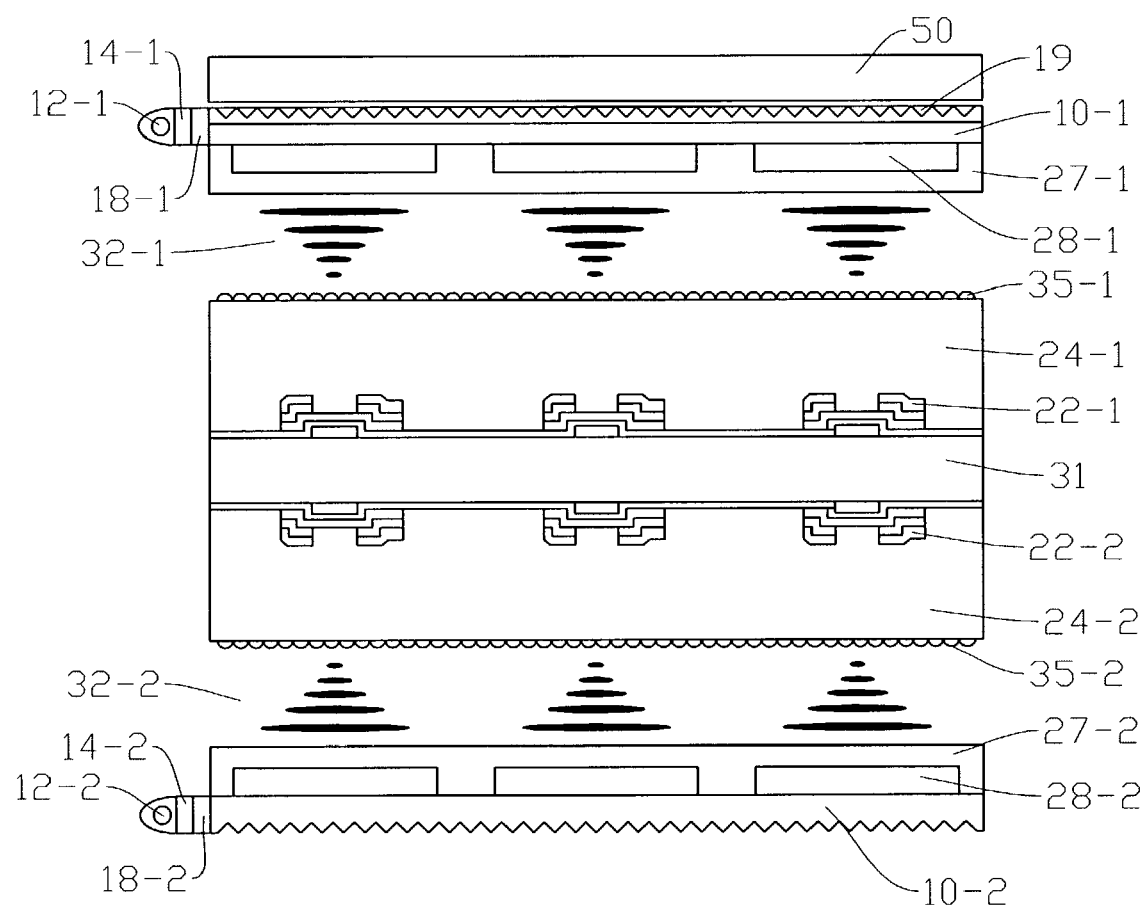
FIG. 12 illustrates a schematic structure of two reflective-type liquid crystal display devices by using two light guide plates as two upper substrates of the two liquid crystal display panels and a touch panel is applied to one liquid crystal display panel in accordance with this invention.

Referring to FIG. 12, a touch panel 50 is applied to an embodiment of this invention as shown in FIG. 8 or FIG. 10 in eighth embodiment. Surface of the light guide plate, which is used as front light source, needs to be planarized, if touch panel is applied to the light guide plate. As shown in FIG. 12, surface of the light guide plate 10-1 is planarized by using an ultraviolet curable resin layer 19. Then, lower electrode of the touch panel 50 is formed directly on the resin layer 19 such that glass substrate for lower electrode of conventional touch panel can be replaced. The whole display module can be applied to single reflective-type liquid crystal display panel or dual liquid crystal display panels, in which second display panel of the dual liquid crystal display panel can be reflective-type or transmissive-type liquid crystal display panel.

All light sources for this invention may be cold cathode fluorescent tube (CCFL), line light source assembled by a plurality of light emitting diode (LED), or other alternate line light source. All these light sources can be used for every situation in this invention.

This invention provides a plane light source structure that plastic light guide plate is used as substrate of the planar display device, in which light guide plate can be lower substrate of transmissive-type liquid crystal display panel or upper substrate of reflective-type liquid crystal display panel. Hence, weight of whole display module can be reduced by using plastic substrate, and volume of whole display module can be minimized by glass substrate of conventional liquid crystal display panel being replaced with light guide plate. Moreover, weight of dual display module can be reduced substantially by using plastic substrate when this invention is applied thereto.

Although specific embodiments have been illustrated and described, it will be obvious to those skilled in the art that various modifications may be made without departing from what is intended to be limited solely by the appended claims.

What is claimed is:

1. A plane light source structure for a planar display device, comprising:
    a first light source;
    a first transparent plastic light guide plate with a light-emitting surface, wherein a plurality of thin film transistors (TFTs) are formed in physical contact with said light-emitting surface, and said first light guide plate serves as a substrate of said planar display device; and
    a polarizing plate located between said first light source and said first light guide plate.

2. The plane light source structure according to claim 1, wherein said planar display device is a first liquid crystal display device.

3. The plane light source structure according to claim 2 further comprising a second liquid crystal display using said first transparent plastic light guide plate as a lower substrate, wherein said second liquid crystal display device is opposite to said first liquid crystal display device by said first transparent plastic light guide plate to form a dual display device.

4. The plane light source structure according to claim 3 further comprising a second light guide plate serving as front light source of said second liquid crystal display, and a second light source located at one end surface of said second light guide plate.

5. The plane light source structure according to claim 2 further comprising a retardation film located between said first transparent plastic light guide plate and said polarizing plate.

6. The plane light source structure according to claim 2, wherein said first transparent plastic light guide plate is an upper substrate of said liquid crystal display device when said first transparent plastic light guide plate serves as front light source of said liquid crystal display device.

7. The plane light source structure according to claim 6, wherein said first transparent plastic light guide plate includes a plate and a plurality of slanted portions (V-cuts) made by an ultraviolet curable resin on said plate.

8. The plane light source structure according to claim 6 further comprising:
    a second liquid crystal display, utilizing said first transparent plastic light guide plate to serve as a lower substrate of said second liquid crystal display device;
    a second light guide plate as front light source of said second liquid crystal display device; and
    a second light source located at one end surface of said second light guide plate, wherein said second liquid crystal display device is opposite to said first liquid crystal display device by said lower substrate to form a dual display device.

9. A plane light source structure for a liquid crystal display panel, comprising:
    a first light source;
    a transparent plastic light guide plate with a light-emitting surface;
    a plurality of thin film transistors (TFTs) in physical contact with said transparent plastic light guide plate; and
    a first polarizing plate located between said first light source and said transparent plastic light guide plate.

10. The plane light source structure according to claim 9 further comprising a second light source located at the other end surface of said transparent plastic light guide plate, and a second polarizing plate located between said second light source and said transparent plastic light guide plate.

11. The plane light source structure according to claim 9, wherein said transparent plastic light guide plate serves as a substrate of said planar display device.

* * * * *